(12) United States Patent
Fukao et al.

(10) Patent No.: US 7,769,014 B2
(45) Date of Patent: Aug. 3, 2010

(54) TRANSMITTING AND RECEIVING SYSTEM, TRANSMITTING APPARATUS, AND RECEIVING APPARATUS

(75) Inventors: Akihito Fukao, Chino (JP); Takao Ozawa, Shiojiri (JP); Eiji Kubota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 12/069,099

(22) Filed: Feb. 7, 2008

(65) Prior Publication Data

US 2008/0192775 A1 Aug. 14, 2008

(30) Foreign Application Priority Data

| Feb. 13, 2007 | (JP) | .............................. 2007-031935 |
| Feb. 13, 2007 | (JP) | .............................. 2007-031941 |
| Oct. 26, 2007 | (JP) | .............................. 2007-278267 |

(51) Int. Cl.
  *H04L 12/28* (2006.01)
  *H04J 3/24* (2006.01)
(52) U.S. Cl. .................... 370/392; 370/394; 370/474
(58) Field of Classification Search ................ 370/392, 370/394, 474
  See application file for complete search history.

(56) References Cited

U.S. PATENT DOCUMENTS

| 2001/0034788 | A1* | 10/2001 | McTernan et al. ........... 709/232 |
| 2003/0156544 | A1* | 8/2003 | Ido .............................. 370/241 |
| 2004/0158754 | A1* | 8/2004 | Walls et al. .................. 713/323 |
| 2005/0083970 | A1* | 4/2005 | Glickman et al. ........... 370/466 |
| 2006/0259844 | A1* | 11/2006 | Kawada ....................... 714/748 |
| 2007/0002864 | A1* | 1/2007 | Yi et al. ....................... 370/394 |
| 2007/0097982 | A1* | 5/2007 | Wen et al. .................... 370/394 |
| 2008/0126562 | A1* | 5/2008 | Ludwig et al. .............. 709/235 |
| 2008/0175186 | A1* | 7/2008 | Liu et al. ..................... 370/320 |
| 2008/0279208 | A1* | 11/2008 | Walls et al. .................. 370/412 |
| 2009/0268747 | A1* | 10/2009 | Kurata et al. ................ 370/412 |

FOREIGN PATENT DOCUMENTS

| JP | 10-070523 | 3/1998 |
| JP | 2000-151680 | 5/2000 |
| JP | 2004-266504 | 9/2004 |

\* cited by examiner

*Primary Examiner*—Andrew Lee
(74) *Attorney, Agent, or Firm*—Nutter McClennen & Fish LLP; John J. Penny, Jr.; Christina M. Sperry

(57) ABSTRACT

A transmitting and receiving method of transmitting and receiving data between a transmitting apparatus and a receiving apparatus through a network that exchanges data using a packet includes: causing at least one of the transmitting apparatus and the receiving apparatus to secure a storage region corresponding to the data as a data region; and causing at least one of the transmitting apparatus and the receiving apparatus to store divided data, which is obtained by dividing the data in a size equal to or smaller than the size of the packet, in the data region to thereby perform the transmission and reception while managing the location of the divided data.

11 Claims, 6 Drawing Sheets

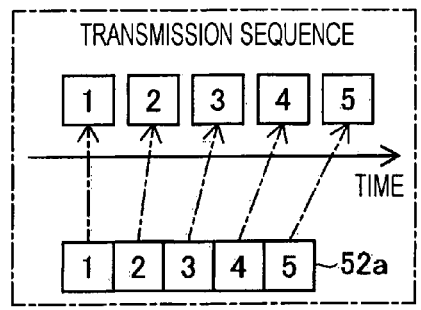
FIG. 6A1
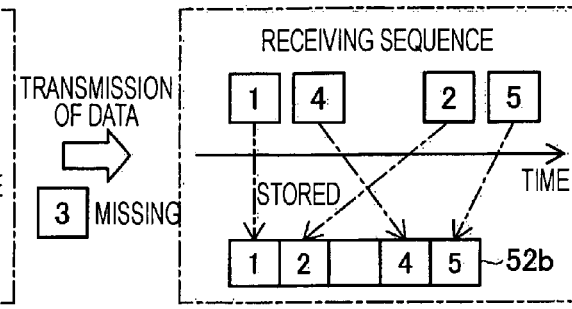
FIG. 6A2
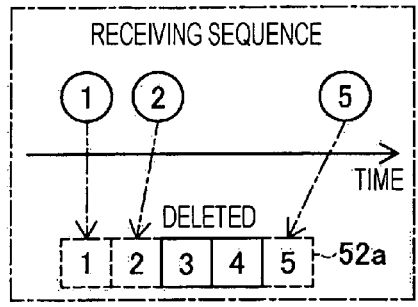
FIG. 6B1
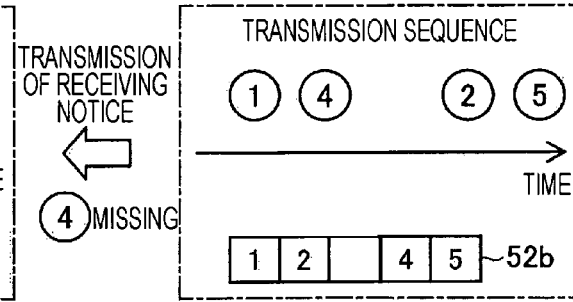
FIG. 6B2
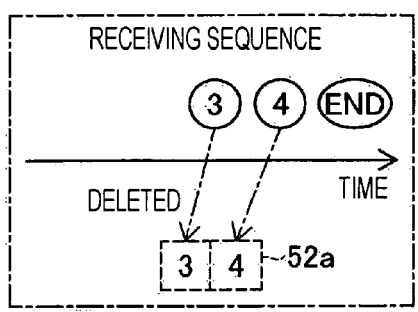
FIG. 6C1
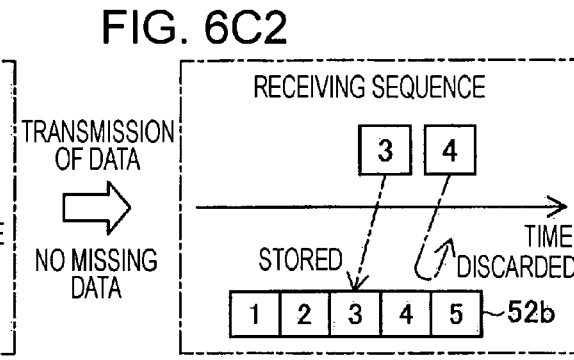
FIG. 6C2
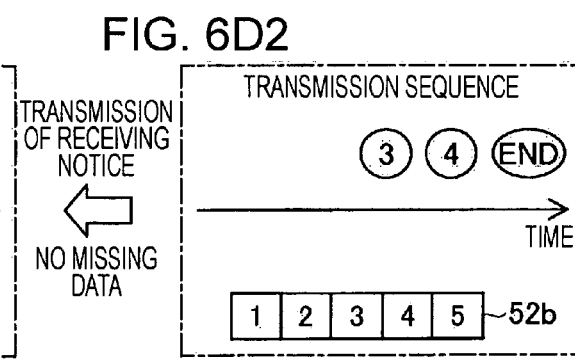
FIG. 6D1 FIG. 6D2

TRANSMITTING AND RECEIVING SYSTEM, TRANSMITTING APPARATUS, AND RECEIVING APPARATUS

BACKGROUND

1. Technical Field

The present invention relates to a technique of transmitting data to a predetermined receiving apparatus or receiving data transmitted from the transmitting apparatus, and in particular, to a technique for sequence control and retransmission control when transmitting data in a divided state or when receiving the data transmitted in a divided state.

2. Related Art

In recent years, communications using a VoIP (voice over Internet protocol) network that performs voice communication using an IP (Internet protocol) have been spread. In the case when communications are performed by using a VoIP network, an RTP (real-time transport protocol) and a UDP (user datagram protocol) are usually used as communication units. The RTP is a protocol that causes data to be transmitted in a unit of a predetermined amount and at predetermined intervals. In addition, the UDP is a protocol that causes data to be transmitted to a receiving side in one way. In the case of the UDP, retransmission control or sequence control is not performed unlike a TCP (transmission control protocol). Accordingly, since the structure of a packet is simple, the UDP has a feature that a communication can be performed at high speed. Accordingly, it can be said that the UDP is a protocol suitable for a voice communication in which a real time is important and there is little influence even if a problem, such as lack of data, occurs to some extent. On the other hand, in the case when data whose reliability is important, for example, JPEG data that does not allow lack of data is transmitted as a deemed voice through a VoIP network, there is a problem that a higher layer than the UDP should cope with the lack of data, a change in sequence, and the like.

In order to solve such a problem, JP-A-2004-266504 discloses a technique in which a receiving side checks the continuity of packets by referring to a sequence number added to an RTP, makes a retransmission request to a transmitting side when it is determined that a packet is missing, and reconstructs the sequence of received and stored packets at a point of time when the missing packet is received.

However, in the above-described case in which the receiving side requests retransmission of a missing packet to the transmitting side, the transmitting side may not determine immediately whether or not a packet corresponding to a sequence number, retransmission of which is not requested, has reached the receiving side. In addition, the retransmission request from the receiving side may also be missing. In this case, since the receiving side should transmit the retransmission request, the total amount of time taken for transmission and reception is uselessly increased. As a result, a problem that communication expenses are increased also occurs. Furthermore, in the above-described method of reconstructing the sequence of packets whenever a missing packet is received, it is necessary to repeatedly perform processing for reconstructing the sequence of packets if a plural number of missing packets occur. As a result, a problem of inefficiency occurs. For this reason, a communication unit that efficiently performs retransmission control of missing data and easily determines a communication state or the ending time of data transmission processing has been demanded. In addition, a communication unit capable of efficiently and easily performing packet sequence control has been demanded.

SUMMARY

The invention has been finalized to solve at least some of the above-mentioned problems, and the invention can be realized according to the following aspects.

According to a first aspect of the invention, a transmitting and receiving method of transmitting and receiving data between a transmitting apparatus and a receiving apparatus through a network that exchanges data using a packet includes: causing at least one of the transmitting apparatus and the receiving apparatus to secure a storage region corresponding to the data as a data region; and causing at least one of the transmitting apparatus and the receiving apparatus to store divided data, which is obtained by dividing the data in a size equal to or smaller than the size of the packet, in the data region to thereby perform the transmission and reception while managing the location of the divided data.

In the transmitting and receiving method described above, at least one of the transmitting apparatus and the receiving apparatus stores the divided data in the data region so as to manage the location of the divided data. Accordingly, the divided data can be efficiently and easily transmitted and received. In addition, the location of divided data refers to a sequence order of divided data, existence of divided data to be transmitted or received divided data, or the like.

According to a second aspect of the invention, a transmitting and receiving system includes a transmitting apparatus and a receiving apparatus that transmits and receives data through a network that exchanges data using a packet. The transmitting apparatus includes: a transmission data dividing unit that divides the data to be transmitted into divided data having a size equal to or smaller than the size of the packet; a transmission data storing unit that stores the divided data in a transmission data region prepared in a storage region; a data transmitting unit that repeatedly transmits the divided data present in the transmission data region to the receiving apparatus; an identification information receiving unit that receives identification information for identifying the received divided data, which is returned from the receiving apparatus that has received the divided data in response to transmission of the divided data; and a transmission-completed divided data excluding unit that excludes the divided data corresponding to the identification information from the transmission data region on the basis of the received identification information, and the receiving apparatus includes: a received data storing unit that receives the divided data through the network and stores the received divided data in a storage region; an identification information replying unit that returns identification information for identifying the divided data to the transmitting apparatus at least whenever the divided data is received; and a receiving completion unit that completes receiving of the data after receiving all the divided data.

In the transmitting and receiving system having the configuration described above, the transmitting apparatus divides the data to be transmitted in a predetermined size, stores the divided data in the transmission data region, and repeatedly transmits the divided data present in the transmission data region to the receiving apparatus. In addition, when the transmitting apparatus receives the identification information from the receiving apparatus, the transmitting apparatus excludes the divided data corresponding to the identification information from the transmission data region. On the other hand, the receiving apparatus returns the identification information for identifying the received divided data to the transmitting apparatus whenever the divided data is received. Accordingly, since the transmitting apparatus receives the identification information and the receiving apparatus receives the divided data, the transmitting apparatus or the receiving apparatus can check that the opposite communication party can normally communicate therewith. As a result, it is possible to perform highly reliable communication while checking a communication state of the opposite communication party. In addition, since the transmitting apparatus retransmits only data that the receiving apparatus may not have received, efficient data transmission can be performed. In addition, since reconstruction of retransmitted data is not needed at the time of retransmission of data, efficient access to transmitted data can be performed.

According to a third aspect of the invention, a transmitting apparatus that transmits data to a receiving apparatus through a network that exchanges data using a packet includes: a transmission data dividing unit that divides the data to be transmitted into divided data having a size equal to or smaller than the size of the packet; a transmission data storing unit that stores the divided data in a transmission data region prepared in a storage region; a data transmitting unit that repeatedly transmits the divided data present in the transmission data region to the receiving apparatus; an identification information receiving unit that receives identification information for identifying the received divided data, which is returned from the receiving apparatus that has received the divided data in response to transmission of the divided data; and a transmission-completed divided data excluding unit that excludes the divided data corresponding to the identification information from the transmission data region on the basis of the received identification information.

According to a fourth aspect of the invention, in the transmitting apparatus according to the third aspect of the invention, preferably, the data transmitting unit transmits the divided data by using a protocol that does not perform retransmission control.

In such a configuration, even in the case of communication using a protocol that performs one-way data transmission and does not perform retransmission control, such as a UDP, efficient retransmission control can be performed.

According to a fifth aspect of the invention, in the transmitting apparatus according to the third or fourth aspect of the invention, preferably, the data transmitting unit completes transmission of the divided data when a notice indicating that all the divided data has been received is received from the receiving apparatus.

According to a sixth aspect of the invention, in the transmitting apparatus according to any one of the third to fifth aspects of the invention, preferably, transmission of the divided data is stopped when the identification information receiving unit does not receive the identification information for a predetermined period of time.

In the above configuration according to the sixth aspect of the invention, transmission of the divided data is stopped when the identification information receiving unit does not receive the identification information for a predetermined period of time. Accordingly, even in the case when a trouble occurs in a communication process or in the receiving apparatus during the communication, it is possible to prevent the communication from becoming long by quickly determining a communication state.

According to a seventh aspect of the invention, in the transmitting apparatus according to any one of the third to sixth aspects of the invention, it is preferable to further include a data information transmitting unit that transmits at least data information on the capacity of the transmitted data before transmission of the data. Preferably, the data transmitting unit sequentially transmits the divided data to the receiving apparatus through the network together with sequence information added corresponding to sequence of the divided data of the data to be transmitted.

According to an eighth aspect of the invention, in the transmitting apparatus according to any one of the third to seventh aspects of the invention, preferably, after a notice, which indicates that preparation to receive the divided data to be transmitted and sequence information has been completed, is received from the receiving apparatus, the data transmitting unit transmits the divided data and the sequence information to the receiving apparatus.

According to a ninth aspect of the invention, a transmitting and receiving system includes a transmitting apparatus and a receiving apparatus that transmits and receives data through a network that exchanges data using a packet. The transmitting apparatus includes: a transmission data dividing unit that divides the data to be transmitted into divided data having a size equal to or smaller than the size of the packet; a data information transmitting unit that transmits at least data information on the capacity of the transmitted data before transmission of the data; and a data transmitting unit that sequentially transmits the divided data to the receiving apparatus through the network together with sequence information added corresponding to sequence of the divided data of the data to be transmitted. The receiving apparatus includes: a data region securing unit that secures at least a storage region, which corresponds to the capacity of the transmitted data, as a received data region before receiving the data when the data information is received from the transmitting apparatus; and a received data storing unit that sequentially receives the divided data from the transmitting apparatus through the network together with the sequence information and stores the received divided data at the position corresponding to the sequence information in the received data region.

In the transmitting and receiving system having the configuration described above, the transmitting apparatus divides data to be transmitted in a predetermined size and transmits the data information on the capacity of the transmitted data to the receiving apparatus beforehand, and then transmits the divided data to the receiving apparatus together with the sequence information. On the other hand, the receiving apparatus secures a received data region on the basis of the data information received from the transmitting apparatus and stores the received divided data at the position corresponding to the sequence information in the received data region together with the sequence information. Accordingly, even when transmitted packets are received in a condition where sequence of the transmitted packets has changed for some reasons, sequence control on the packets can be performed efficiently and easily.

According to a tenth aspect of the invention, a receiving apparatus that receives data from a transmitting apparatus through a network that exchanges data using a packet includes: a data region securing unit that receives data information on the capacity of transmitted data from the transmitting apparatus and secures a storage region corresponding to the capacity as a received data region before receiving the data; a divided data receiving unit that sequentially receives the divided data, which is obtained by dividing the transmitted data in a size equal to or smaller than the size of the packet, from the transmitting apparatus through the network together with sequence information corresponding to sequence of the divided data of the data to be transmitted; and a received data storing unit that stores the received divided data at the position corresponding to the sequence information in the received data region. In the configurations according to the seventh and tenth aspects of the invention, the same effects as in the ninth aspect of the invention are obtained.

According to an eleventh aspect of the invention, in the receiving apparatus according to the tenth aspect of the invention, it is preferable to further include a preparation completion notice transmitting unit that notifies the transmitting apparatus that preparation to receive the divided data and the sequence information has been completed when the data region securing unit secures the received data region.

In the configurations according to the eighth and eleventh aspects of the invention, the receiving apparatus receives the data information and transmits a notice, which indicates that preparation to receive the divided data and the sequence information has been completed, to the transmitting apparatus when the received data region is secured. On the other hand, the transmitting apparatus transmits the divided data and the sequence information after receiving the notice. Thus, since the transmitting apparatus transmits data after checking the state of the receiving apparatus, the communication can be reliably performed.

According to a twelfth aspect of the invention, in the receiving apparatus according to the tenth or eleventh aspect of the invention, it is preferable to further include an identification information replying unit that returns identification information for identifying the divided data to the transmitting apparatus at least whenever the divided data is received. In the configurations according to the third and twelfth aspects of the invention, the same effects as in the second aspect of the invention are obtained.

According to a thirteenth aspect of the invention, in the receiving apparatus according to any one of the tenth to twelfth aspects of the invention, it is preferable to further include a receiving completion notifying unit that transmits a notice, which indicates that receiving of the data has been completed, to the transmitting apparatus after all the divided data is received.

In the configurations according to the fifth and thirteenth aspects of the invention, the transmitting apparatus can complete transmission of data when the notice, which indicates that receiving of the data has been completed, transmitted from the receiving apparatus is received as well as when all the identification information corresponding to the transmitted divided data is received. Thus, the transmitting apparatus has two kinds of criteria for determination on completion of data transmission. Accordingly, even if a packet is missing in a communication process, the ending time of transmission processing can be quickly determined on the basis of one of the criteria for determination.

In addition, the invention may also be configured as a computer program for transmitting or receiving data.

BRIEF DESCRIPTION OF THE DRAWINGS

The invention will be described with reference to the accompanying drawings, wherein like numbers reference like elements.

FIGS. 6A1 to 6D2 are explanatory views regarding retransmission control and sequence control of data communication between the terminal adapters.

DESCRIPTION OF EXEMPLARY EMBODIMENTS

Figure 1:
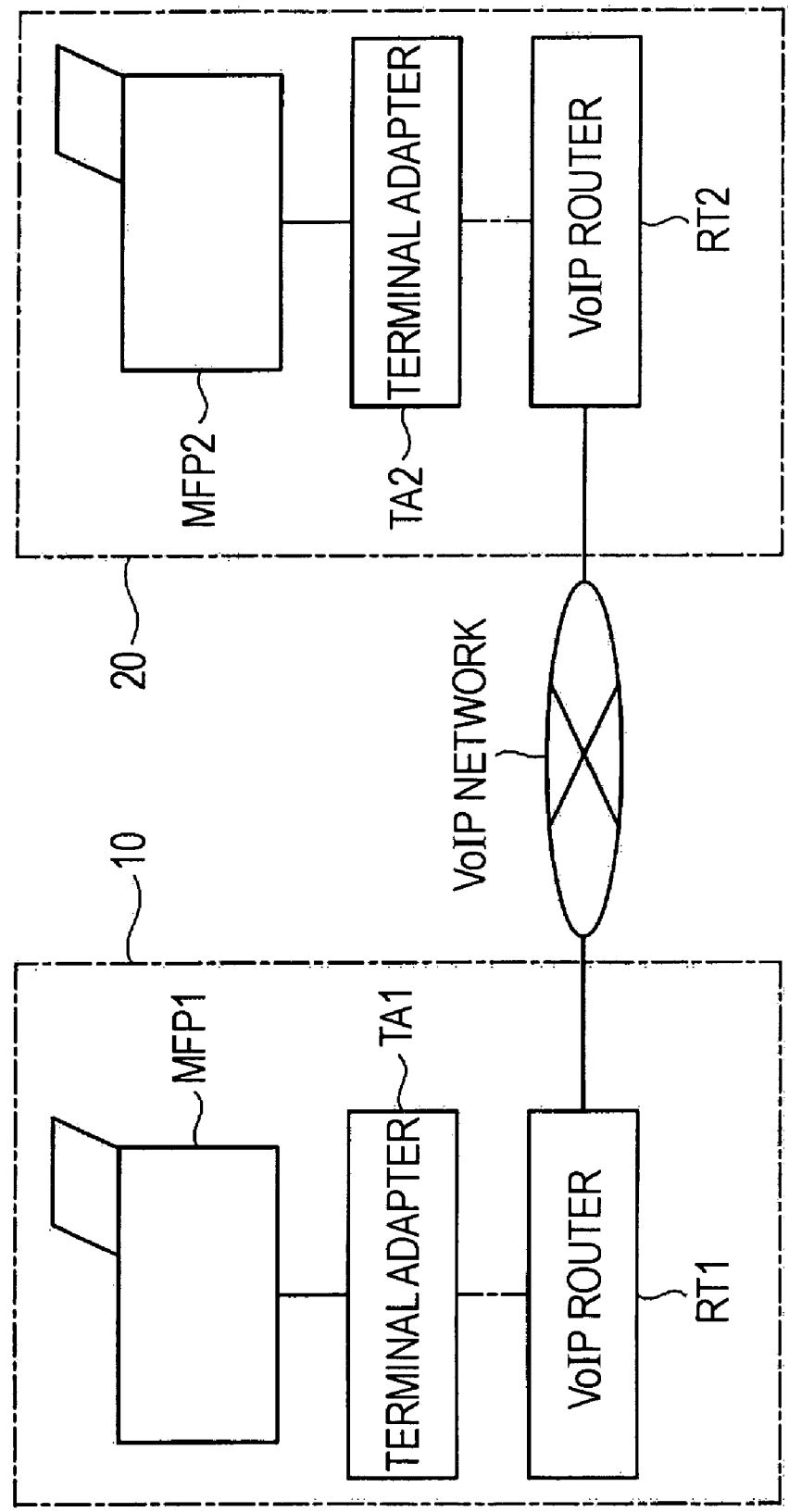
FIG. 1 is an explanatory view schematically illustrating the configuration of a transmitting and receiving system according to an embodiment of the invention.

An embodiment of the invention will be described. First, a schematic configuration of a transmitting and receiving system according to an embodiment of the invention is shown in FIG. 1. As shown in the drawing, a transmitting-side network system 10 and a receiving-side network system 20 are connected to each other through Internet INT. The transmitting-side network system 10 and the receiving-side network system 20 have functions of performing communications using a VoIP, and the Internet INT herein functions as a VoIP network. Hereinafter, the Internet INT is called a VoIP network. The VoIP network is the infrastructure which performs voice communications based on the Internet protocol, for example, an IP phone network. Through the VoIP network, communications using an RTP, which transmits a predetermined amount of data at predetermined intervals, and a UDP, which performs one-way data transmission without performing retransmission and sequence control, are performed.

The transmitting-side network system 10 is configured to include a printer MFP1, a terminal adapter TA1, and a VoIP router RT1 connected to each other. Similarly, the receiving-side network system 20 is configured to include a printer MFP2, a terminal adapter TA2, and a VoIP router RT2 connected to each other.

Each of the printers MFP1 and MFP2 is a so-called multifunction printer and includes a scanner. Each of the terminal adapters TA1 and TA2 is a communication terminal, which transmits a data file instead of a voice as a deemed voice using the RTP and UDP, and has its own phone number and IP address. The VoIP routers RT1 and RT2 are dedicated routers that receive a request of call control of the terminal adapters TA1 and TA2 and perform call control in a VoIP network or voice data transmission processing.

Moreover, in the present embodiment, the transmitting-side network system 10 and the receiving-side network system 20 are connected to each other through a VoIP network that transmits data by specifying an opposite party and performing so-called PtoP (peer to peer) communication. However, the transmitting-side network system 10 and the receiving-side network system 20 may be connected to each other through other communication units that perform packet communications as long as similar communication is possible.

Furthermore, in the present embodiment, both connection between the printer MFP1 and the terminal adapter TA1 and connected between the printer MFP2 and the terminal adapter TA2 are made by using a USB connection method, and both connection between the terminal adapter TA1 and the VoIP router RT1 and connection between the terminal adapter TA2 and the VoIP router RT2 are made by using a wireless LAN connection method. However, other connection methods may also be used.

Furthermore, in the present embodiment, the printer MFP1, the terminal adapter TA1, and the VoIP router RT1 are separately provided, and the printer MFP2, the terminal adapter TA2, and the VoIP router RT2 are separately configured. However, these may be integrally configured. For example, the printer MFP1 and the terminal adapter TA1 may be integrally configured or the terminal adapter TA1 and the VoIP router RT1 may be integrally configured.

Figure 2:
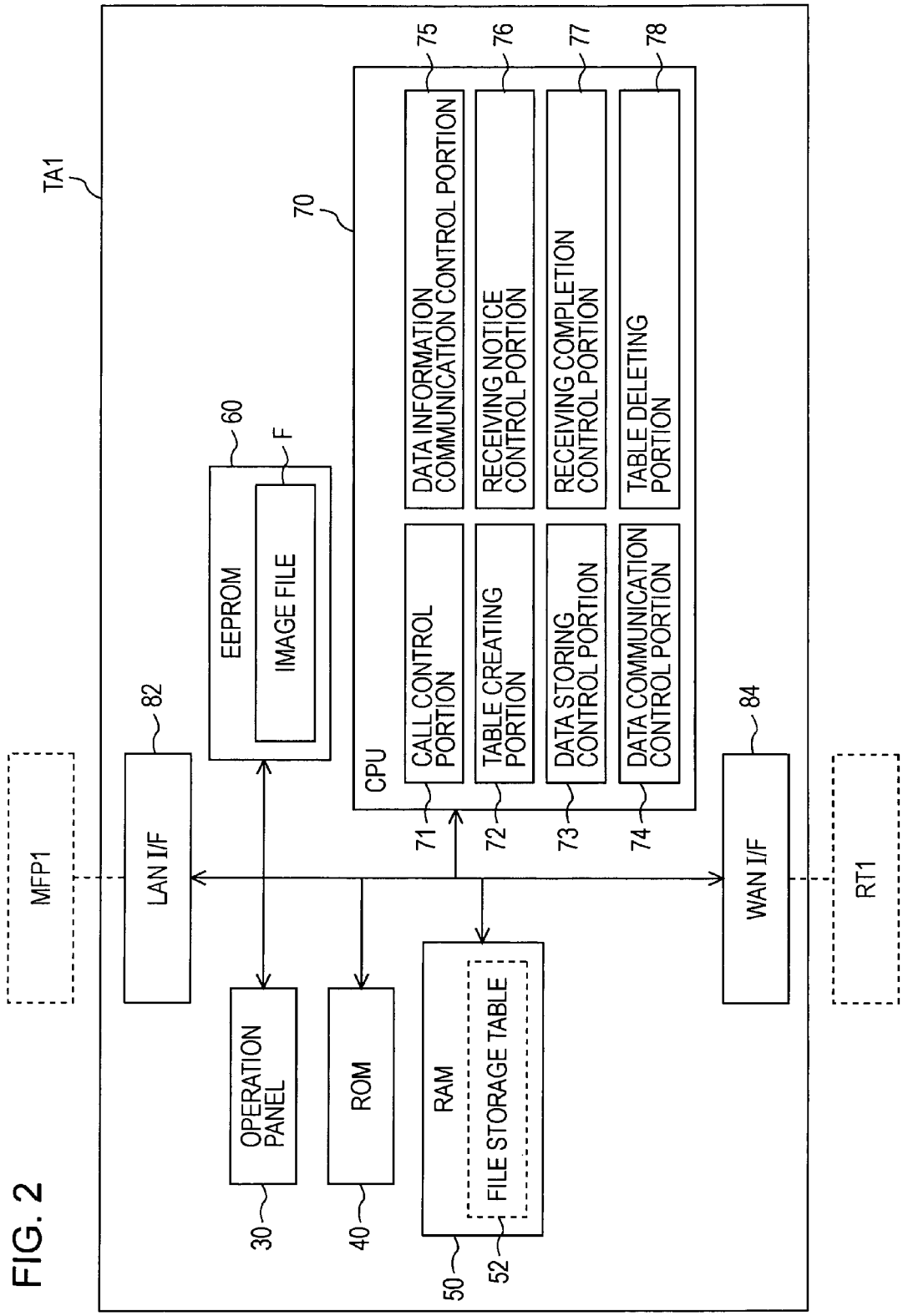
FIG. 2 is an explanatory view illustrating the internal configuration of a terminal adapter.

Next, an internal configuration of the terminal adapter TA1 is shown in FIG. 2. The terminal adapter TA1 includes an operation panel 30, a ROM 40, a RAM 50, an EEPROM 60, a CPU 70, a LAN interface 82, and a WAN interface 84.

The operation panel 30 is a user interface used when a user of the transmitting-side network system 10 operates the terminal adapter TA1 and includes buttons used to input a telephone number of the terminal adapter TA2, which is an opposite communication party, a calling button, a button used to receive a call, a button used to hang up a phone, and the like.

A control program related to starting transmitting and receiving processing for a file, which will be described later, and overall operations of the terminal adapter TA1 is stored in the ROM 40. The RAM 50 has a work area for executing a control program and a storage region used as a file storage table 52 at the time of file transmitting and receiving processing, which will be described later. The EEPROM 60 has a storage region where files transmitted or received at the time of file transmitting and receiving processing, which will be described later, are stored. In addition, FIG. 2 illustrates a state in which a user of the transmitting-side network system 10 acquires a photographic image as digital data by using a scanner provided in the printer MFP1 and stores the digital data as an image file F in the EEPROM 60.

The CPU 70 functions as functional portions (71 to 78 in the drawing) by loading a control program stored in the ROM 40 to the RAM 50 and then executing the control program.

The LAN interface 82 is a USB interface for connection with the printer MFP1. In addition, the WAN interface 84 is a wireless LAN interface for connection with the VoIP router RT1.

The terminal adapter TA1 and the printer MFP1 having the configuration described above may function as a facsimile when the terminal adapter TA1 transmits image data acquired by using the scanner provided in the printer MFP1 or the terminal adapter TA1 receives transmitted image data and the printer MFP1 prints the image data.

In addition, even though an explanation on the terminal adapter TA2 is omitted, the terminal adapter TA2 has the same internal configuration as the terminal adapter TA1. Accordingly, hereinafter, 'a' is added to the end of reference numeral denoting each constituent component in the internal configuration of the terminal adapter TA1 and 'b' is added to the end of reference numeral denoting each constituent component in the internal configuration of the terminal adapter TA2 in order to distinguish between the constituent components.

Figure 3:
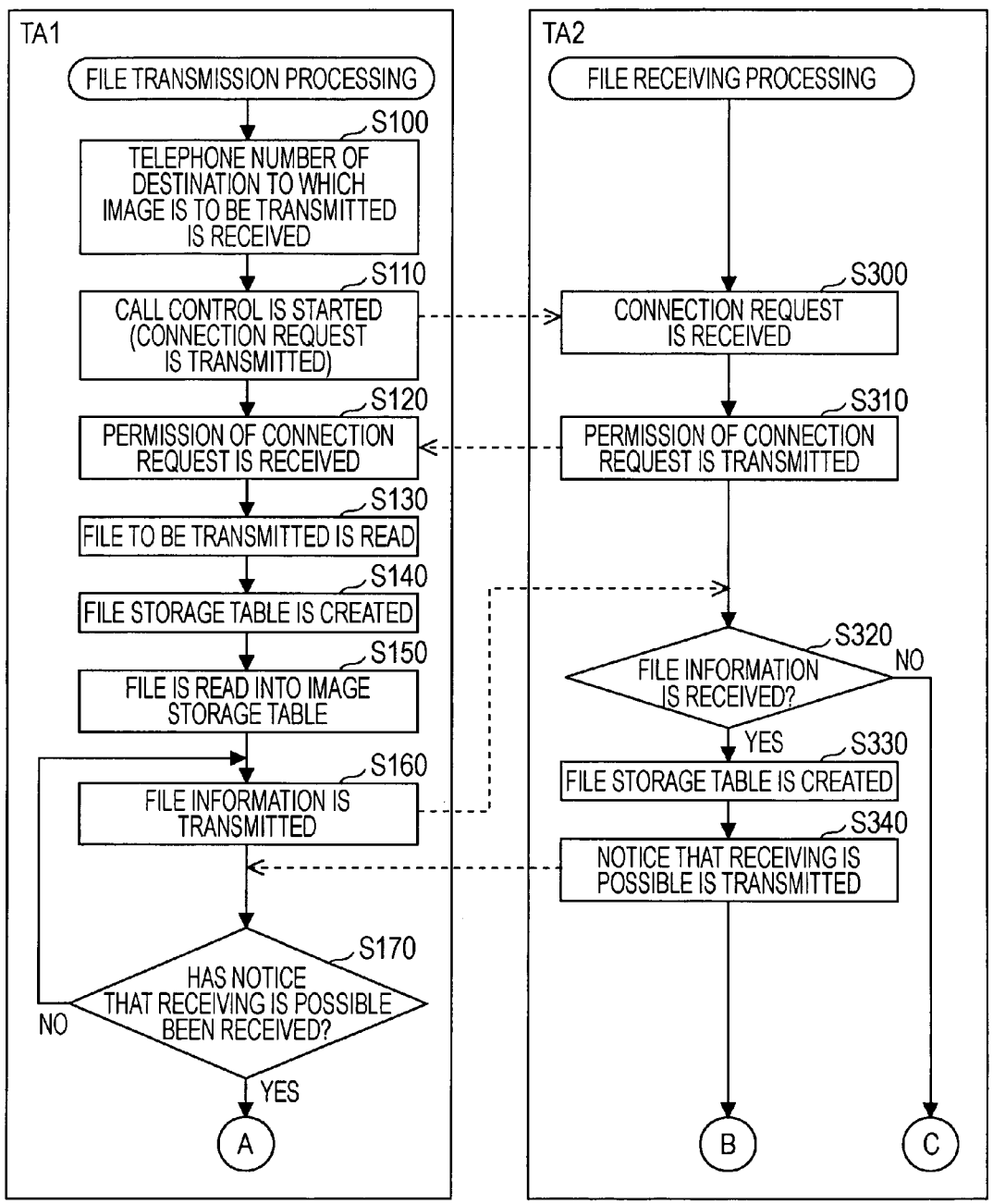
FIG. 3 is an explanatory view illustrating the procedures in which the terminal adapter transmits an image file to another terminal adapter through a VoIP network.
Figure 4:
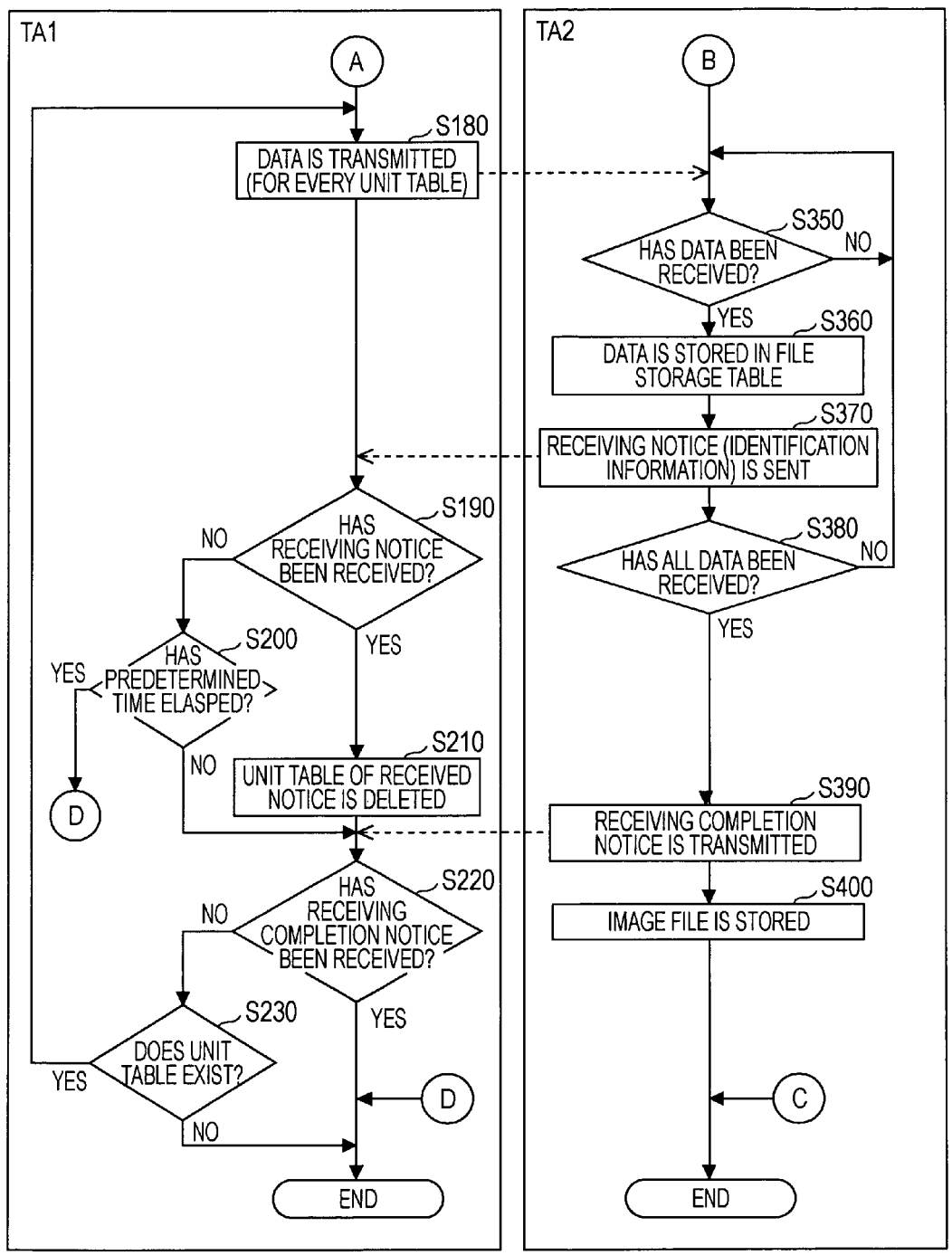
FIG. 4 is an explanatory view illustrating the procedures in which the terminal adapter transmits the image file to another terminal adapter through the VoIP network.

Next, procedures of file transmission processing of the terminal adapter TA1 and procedures of file receiving processing of the terminal adapter TA2 when the terminal adapter TA1 transmits the image file F to the terminal adapter TA2 through the VoIP network are shown in FIGS. 3 and 4. Such processing is file transmission processing required when a user of the transmitting-side network system 10 transmits the image file F, which is acquired by using the scanner provided in the printer MFP1, from the terminal adapter TA1 to the terminal adapter TA2 through the VoIP network and a user of the receiving-side network system 20 prints the image file F, which is received in the terminal adapter TA2, with the printer MFP2. In addition, the above-described transmission processing may be processing for inserting a memory card into a memory card slot provided in the printer MFP1 and transmitting data stored in the memory card.

First, as preparation for processing shown in FIGS. 3 and 4, when power is supplied to the terminal adapter TA1, a CPU 70a registers a telephone number and an IP address of the terminal adapter TA1 in the VoIP router RT1 as processing of a call control portion 71a. Similarly, when power is supplied to the terminal adapter TA2, a CPU 70b registers a telephone number and an IP address of the terminal adapter TA2 in the VoIP router RT2.

Then, the file transmission processing of the terminal adapter TA1 shown in FIGS. 3 and 4 is started when the user of the transmitting-side network system 10 inputs a telephone number of a transmission destination of the image file F, that is, a telephone number of the terminal adapter TA2 by using a operation panel 30a of the terminal adapter TA1. When the processing is started, the terminal adapter TA1 first receives the telephone number of the transmission destination of the image file F (step S100).

Then, when a calling operation is performed by a user operation, the CPU 70a of the terminal adapter TA1 transmits to the VoIP router RT1 a request for connection of the received telephone number as processing of the call control portion 71a (step S110). In response to the request, the VoIP router RT1 notifies the terminal adapter TA2, through the VoIP network and the VoIP router RT2, that the connection request with respect to the terminal adapter TA2 having an IP address associated with the telephone number is made.

On the other hand, in the terminal adapter TA2 which is a receiving side, file receiving processing is started by receiving the above connection request. When the above connection request is received (step S300), the CPU 70b of the terminal adapter TA2 replies to the terminal adapter TA1 that the connection request is permitted through the VoIP router RT2, the VoIP router RT1, and the VoIP network as processing of a call control portion 71b (step S310). In addition, in the present embodiment, permission of the connection request is automatically returned to the terminal adapter TA1 after the connection request is received. However, permission of the connection request may be performed in other ways. For example, permission of the connection request may be returned by causing the user of the receiving-side network system 20 to press a button, which is used to receive a call, of an operation panel 30b provided in the terminal adapter TA2.

Moreover, in the present embodiment, a telephone number and an IP address of the terminal adapter TA1 are registered in the VoIP router RT1 and a telephone number and an IP address of the terminal adapter TA2 are registered in the VoIP router RT2 and the VoIP routers RT1 and RT2 perform call control. However, the invention is not limited to such a method. For example, in the case when the call control is performed by using an SIP (session initiation protocol), the telephone numbers and the IP addresses may be registered in an SIP server, which is a call control server, such that the terminal adapter TA1 and the terminal adapter TA2 establish a communication path through the SIP server.

On the other hand, the CPU 70a of the terminal adapter TA1 waits for a reply of connection permission as processing of the call control portion 71a after the connection request is transmitted in step S110. Then, when permission of the connection request is received (step S120), the CPU 70a reads the image file F stored in an EEPROM 60a (step S130) and creates a file storage table 52a corresponding to the file size of the image file F in a RAM 50a as processing of a table creating portion 72a (step S140). Then, as processing of a data storing control portion 73a, the image file F is read into the created file storage table 52a (step S150). Furthermore, in the present embodiment, all files stored in the EEPROM 60a are automatically read as objects to be transmitted in step S130. However, a user may select a file to be transmitted by using the operation panel 30.

Figure 5A:
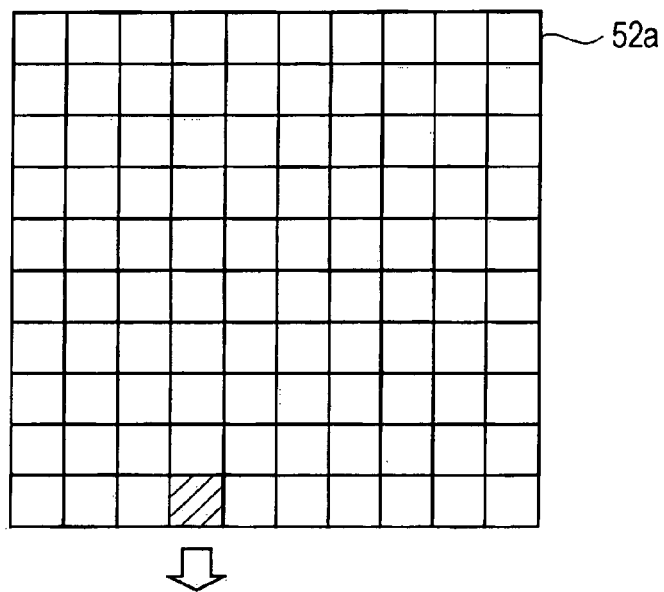
FIGS. 5A and 5B are explanatory views illustrating an example of a file storage table.

The processing in steps S140 and S150 will be described in detail with reference to FIG. 5 illustrating an example of the file storage table 52a. The file storage table 52a is a table in which the image file F is stored in a condition where the image file F is divided in a predetermined unit size. For example, in case where the unit size is set to 152 bytes, if the size of the image file F is 15100 bytes, the CPU 70a creates the file storage table 52a including 100 (15100 byte/152=99 remainder 52) unit tables UTi in step S140, as shown in FIG. 5A. In addition, all the unit tables UTi have the same size. For example, when the above example is used, first to ninety-ninth divided data SD1 to SD99 has 152 bytes and one-hundredth divided data SD100 has 52 bytes. However, the unit table UT100 in which the data having 52 bytes is stored has the same size as the unit tables UT1 to UT99 in which data having 152 bytes is stored.

Figure 5B:
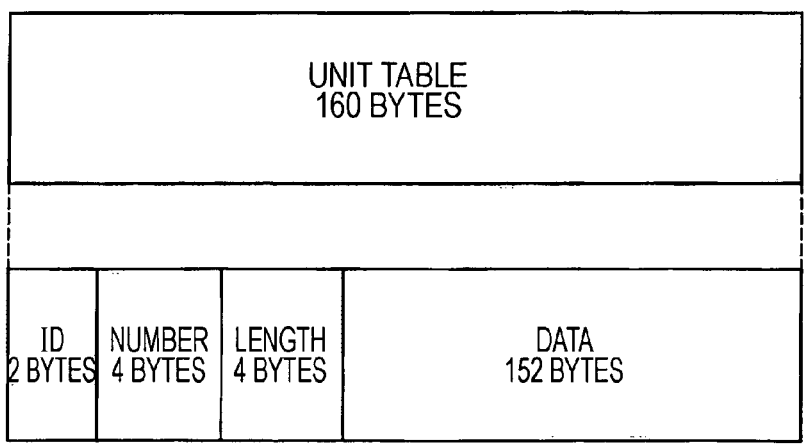

Then, in step S150, as processing of the data storing control portion 73a, the CPU 70a adds ID information I, Number information Ni, and Length information Li to each divided data SDi obtained by dividing the image file F and then stores the divided data SDi in the unit table UTi included in the file storage table 52a, as shown in FIG. 5B. Thus, each data, which is obtained by adding other information to the divided data SDi, stored in the file storage table 52a is hereinafter referred to as 'storage data HDi'.

In the example shown in FIG. 5B, the storage data HDi is stored in the unit table UTi as data having total 160 bytes obtained by adding the ID information I having 2 bytes, the Number information Ni having 4 bytes, and the Length information Li having 2 bytes to the divided data SDi of the image file F divided into the unit size of 152 bytes. Accordingly, the size of the unit table UTi is also 160 bytes.

The ID information I is an identifier used to identify that a corresponding storage region of the RAM 50 is a region used as the file storage table 52a. The Number information Ni is sequence information on the divided data SDi. In the above example, the Number information Ni is numbers of 1 to 100, for example. The Length information Li indicates the data length of the divided data SDi. In the above example, the Length information Li is 152 in the case of the first to ninety-ninth divided data SD1 to SD99, and the Length information Li is 52 in the case of the one-hundredth divided data SD100.

Moreover, in the present embodiment, the size of the unit table UTi is set to 160 bytes so as to meet the UDP. However, the size of the unit table UTi may change depending on a used communication unit without being limited to that described above. In addition, the unit size used when dividing the image file F may also be changed depending on the size of the unit table UTi and the size of data added to the divided data SDi.

Here, an explanation is continued referring back to FIGS. 3 and 4. In step S150, when the image file F is read into the file storage table 52a, the CPU 70a of the terminal adapter TA1 transmits file information of the image file F to the terminal adapter TA2 as processing of a data information communication control portion 75a (step S160). The file information is information allowing the total capacity of the image file F to be recognized. In the present embodiment, the file information is a value (15100 in the above example) indicating the total capacity. However, the file information may be other information that allows the total capacity to be recognized by means of the number of storage data HDi, for example. In addition, since the terminal adapter TA1 and the terminal adapter TA2 check the size of a packet, which is transmitted from the opposite party, when the terminal adapter TA1 and the terminal adapter TA2 are connected to each other, the number of storage data HDi can be seen by checking the total capacity of the image file F. In addition, the packet size described above may be specified beforehand in the terminal adapter TA1 and the terminal adapter TA2.

On the other hand, after permission of the connection request is transmitted in step S310, the CPU 70b of the terminal adapter TA2 determines whether or not file information transmitted from the terminal adapter TA1 has been received, as processing of a data information communication control portion 75b (step S320). As a result, if it is determined that the file information has not been received within a predetermined time (step S320: NO), file receiving processing is stopped. If it is determined that the file information has been received (step S320: YES), the CPU 70b creates a file storage table 52b in a RAM 50b on the basis of the received file information, as processing of a table creating portion 72b (step S330). The file storage table 52b has the same configuration as the file storage table 52a that the terminal adapter TA1 has created in step S140, that is, includes the unit tables UTi having the same size and number as in the file storage table 52a. In addition, since the terminal adapter TA1 and the terminal adapter TA2 check the size of a packet, which is transmitted from the opposite party, when the terminal adapter TA1 and the terminal adapter TA2 are connected to each other, the terminal adapter TA2 can create the file storage table 52b having the same configuration as the file storage table 52a, which is created by the terminal adapter TA1, by checking the total capacity of the image file F. The packet size described above may be specified beforehand in the terminal adapter TA1 and the terminal adapter TA2.

When the file storage table 52b is created, the CPU 70b transmits to the terminal adapter TA1 a notice that receiving is possible, which indicates that the storage data HDi from the terminal adapter TA1 can be received (step S340).

On the other hand, after the file information is transmitted in step S160, the CPU 70a of the terminal adapter TA1 determines whether or not a notice, which indicates that receiving is possible, transmitted from the terminal adapter TA2 has been received (step S170). As a result, if it is determined that the notice that receiving is possible has not been received within a predetermined time (step S170: NO), the CPU 70a returns to processing in step S160 to retransmit file information. If it is determined that the notice that receiving is possible has been received (step S170: YES), the CPU 70a sequentially transmits all the storage data HDi regarding the image file F, which is read into the file storage table 52a in step S150, to the terminal adapter TA2 as processing of a data communication control portion 74a (step S180). Here, an RTP header, a UDP header, and the like are added to the storage data HDi and then the divided storage data HDi is transmitted in the order of the Number information Ni with the storage data HDi (160 bytes in the above example) as a unit.

This processing is specifically illustrated using FIG. 6A1. In an example shown in FIG. 6A1, the file storage table 52a includes five unit tables UTn ('n' is an integer of 1 to 5). The image file F is divided to be stored in the unit tables UTn in a condition where the Number information Nn is added to the image file F. In addition, numbers in the drawing indicate the Number information Nn, and each number surrounded by a rectangle indicates storage data HDn stored in the unit table UTn. In this case, in step S180, the storage data HDn stored in the unit tables UTn is transmitted to the terminal adapter TA2 in the order of storage data HD1, HD2, HD3, HD4, and HD5.

On the other hand, after the notice that receiving is possible is transmitted in step S340, the CPU 70b of the terminal adapter TA2 determines whether or not the storage data HDi transmitted from the terminal adapter TA1 has been received, as processing of a data communication control portion 74b (step S350). As a result, if it is determined that the storage data HDi has not been received (step S350: NO), the CPU 70b waits until the storage data HDi is received.

Then, when the storage data HDi is received (step S350: YES), the CPU 70b stores the received storage data HDi in a place corresponding to the Number information Ni of the file storage table 52b created in step S330 while referring to the Number information Ni included in the received storage data HDi, as processing of a data storing control portion 73b (step S360).

Step S360 is illustrated in FIG. 6A2 as processing in the case where the storage data HDn transmitted in FIG. 6A1 is received. In this example, among the storage data HD1 to HD5 transmitted from the terminal adapter TA1, the storage data HD3 is missing and the order in which the storage data HD2 and the storage data HD4 reach changes for some reasons during a communication performed through the VoIP network. As a result, the data is received in the order of the storage data HD1, HD4, HD2, and HD5 in the terminal adapter TA2. At this time, the terminal adapter TA2 stores the received storage data HD1, HD4, HD2, and HD5 in the unit tables UT1, UT4, UT2, and UT5 of the file storage table 52b in the order of the storage data HD1, HD4, HD2, and HD5. As a result, only the unit table UT3 in which the storage data HD3 is to be stored is empty.

In addition, there is a case in which the terminal adapter TA1 determines that the terminal adapter TA2 cannot receive the storage data HDi, which has been transmitted from the terminal adapter TA1, and retransmits the storage data HDi, which will be described later. In the case when the retransmitted data is received, the CPU 70b discards the received data if the retransmitted data is already stored in the file storage table 52b.

When the received storage data HDi is stored in the file storage table 52b, the CPU 70b of the terminal adapter TA2 transmits to the terminal adapter TA1 a receiving notice RNi, which shows the Number information Ni included in the received storage data HDi, in order to notify the terminal adapter TA1 that the storage data HDi has been received as processing of a receiving notice control portion 76b (step S370). In addition, the receiving notice RNi is transmitted even when the received storage data HDi is discarded.

In step S370, for example, when the received file is stored as shown in FIG. 6A2, the terminal adapter TA2 transmits to the terminal adapter TA1 a receiving notice RNn showing the Number information Nn corresponding to the received storage data HD1, HD4, HD2, and HD5 in the order of RN1, RN4, RN2, and RN5, as shown in FIG. 6B2. In addition, each number surrounded by a circle in the drawing indicates the receiving notice RNn.

On the other hand, after the storage data HDi is transmitted in step S180, the CPU 70a of the terminal adapter TA1 determines whether or not the receiving notice RNi, which is transmitted from the terminal adapter TA2 in step S370, has been received as processing of a receiving notice control portion 76a (step S190). As a result, if it is determined that the receiving notice RNi has been received (step S190: YES), the CPU 70a deletes the unit table UTi of the file storage table 52a corresponding to the Number information Ni indicated by the received receiving notice RNi, as processing of a table deleting portion 78a (step S210). Moreover, in the present embodiment, deletion of the unit table UTi means deleting the storage data HDi stored in the unit table UTi. Thus, since the ID information I included in the unit table UTi is also deleted, the CPU 70a cannot recognize the unit table UTi as a unit table.

Step S210 is illustrated in FIG. 6B1 as processing in the case where the receiving notice RNn transmitted in FIG. 6B2 is received. In this example, among the receiving notice RNn transmitted from the terminal adapter TA2, a receiving notice RN4 is missing for some reasons during a communication performed through the VoIP network, and the receiving notice is received in the order of the receiving notice RN1, RN2, and RN5 in the terminal adapter TA1. At this time, the terminal adapter TA1 determines that it is not necessary to retransmit the storage data HD1, HD2, and HD5 on the basis of the received receiving notice RN1, RN2, and RN5 because the terminal adapter TA2 has received the storage data HD1, HD2, and HD5 and then deletes the unit tables UT1, UT2, and UT5 of the file storage table 52a, as shown in FIG. 6B1. As a result, only the unit tables UT3 and UT4, in which the storage data HD3 and HD4 corresponding receiving notice RNn of which is not received is stored, remain in the file storage table 52a.

After the unit table UTi is deleted, the CPU 70a determines whether or not a receiving completion notice END, which will be described later, transmitted from the terminal adapter TA2 has been received (step S220). As a result, if it is determined that the receiving completion notice END has been received (step S220: YES), the CPU 70a completes the file transmission processing since it is determined that the terminal adapter TA2 has received all the storage data HDi of the image file F.

On the other hand, if it is determined that the receiving completion notice END has not been received (step S220: NO), the CPU 70a determines whether or not the unit table UTi of the file storage table 52a exists, that is, whether or not all the unit tables UTi included in the file storage table 52a have been deleted (step S230). This determination is made by determining whether or not a storage region having ID information exists in the RAM 50.

As a result, if it is determined that the unit table UTi does not exist (step S230: NO), the CPU 70a completes file communications processing since it is determined that all the receiving notice RNi, which corresponds to the storage data HDi that the terminal adapter TA1 has transmitted, has been received, that is, the terminal adapter TA2 has received all the storage data HDi of the image file F.

On the other hand, if it is determined that the unit table UTi exists (step S230: YES), the terminal adapter TA1 has not received all the receiving notice RNi corresponding to the transmitted storage data HDi. This means that the receiving notice RNi transmitted from the terminal adapter TA2 in step S370 is missing for some reason while the receiving notice RNi is being transmitted to the terminal adapter TA1 through the VoIP network or the storage data HDi that the terminal adapter TA1 has transmitted in step S180 is missing for some reason while the storage data HDi is being transmitted to the terminal adapter TA2, such that the terminal adapter TA2 could not receive the storage data HDi. Accordingly, since the storage data HDi of the image file F that the terminal adapter TA2 could not receive may exist, the CPU 70a returns to processing in step S180 to retransmit the storage data HDi.

Moreover, the data transmission in step S180 in this retransmission stage means retransmitting only the storage data HDi stored in the unit table UTi of the file storage table 52a that is not deleted in step S210. For example, in the case when the unit tables UT1, UT2, and UT5 are deleted as shown in FIG. 6B1, the storage data HD3 and HD4 stored in the unit tables UT3 and UT4 are retransmitted as shown in FIG. 6C1.

Thus, when the terminal adapter TA2 receives the storage data HD3 and HD4 retransmitted from the terminal adapter TA1, the CPU 70b of the terminal adapter TA2 stores the storage data HD3 in the unit table UT3, in which data is not stored, of the file storage table 52b and discards the storage data HD4, which is transmitted again even though the storage data HD4 is already stored in the unit table UT4, as processing of the data storing control portion 73b as shown in FIG. 6C2 (corresponding to step S360).

An explanation returns to step S190. If it is determined that the receiving notice RNi has not been received (step S190: NO), the CPU 70a determines whether or not a predetermined time has elapsed after receiving the last receiving notice RNi (after receiving the storage data HDi in the case where the receiving notice RNi is not received at all) (step S200). Then, if it is determined that the predetermined time has elapsed (step S200: YES), there is a high possibility that interruption occurs in a communication between the terminal adapter TA1 and the terminal adapter TA2, and accordingly, the file transmission processing is stopped. If it is determined that the predetermined time has not elapsed (step S200: NO), the process proceeds to step S220.

On the other hand, after the receiving notice RNi has been transmitted in step S370, the CPU 70b of the terminal adapter TA2 determines whether or not all the storage data HDi of the image file F has been received (step S380). This determination is made by determining whether or not the received storage data HDi is stored in all the unit tables UTi included in the file storage table 52b. For example, in the example shown in FIG. 6B2, it is determined that the whole image file F has not been received because the storage data HD3 is not stored in the unit table UT3 of the file storage table 52b. In addition, determination of receiving completion in step S380 is not limited to the above-described method but various kinds of methods may be considered. For example, the terminal adapter TA1 may notify the terminal adapter TA2 that all receiving notice RNi has been received when it is determined that all receiving notice RNi has been received and the terminal adapter TA2 may determine completion of reception by receiving the notice.

Thus, if it is determined that all the storage data HDi has not been received (step S380: NO), the process returns to step S350 to waits until the storage data HDi is further received. On the other hand, if it is determined that all the storage data HDi has been received (step S380: YES), the CPU 70b transmits to the terminal adapter TA1 the receiving completion notice END, which indicates that all the storage data HDi of the image file F has been received, as processing of a receiving completion control portion 77b (step S390). For example, in the case where the storage data HD3 and HD4 has been received as shown in FIG. 6C2, receiving notice RN3 and RN4 corresponding to the Number information N3 and N4 of the received storage data HD3 and HD4 is transmitted to the terminal adapter TA1 (corresponding to step S370), and then it is determined that the storage data HDn is stored in all the unit tables UTn of the file storage table 52b (corresponding to step S380: YES) and the receiving completion notice END is transmitted to the terminal adapter TA1, as shown in FIG. 6D2.

Thus, when the terminal adapter TA1 receives the receiving notice RN3 and RN4 and the receiving completion notice END that the terminal adapter TA2 has transmitted, the CPU 70a of the terminal adapter TA1 determines from the received receiving notice RN3 and RN4 that the terminal adapter TA2 has received the storage data HD3 and HD4 and deletes the unit tables UT3 and UT4 of the file storage table 52a, as shown in FIG. 6D1 (corresponding to step S210). Then, it is determined that the receiving completion notice END has been received, and a series of file transmission processing is completed (corresponding to step S220: YES).

When all the storage data HDi that the terminal adapter TA1 has transmitted is stored in the file storage table 52b of the terminal adapter TA2 through the above processing, the CPU 70b of the terminal adapter TA2 stores the storage data as the image file F in an EEPROM 60b (step S400) and completes the file receiving processing.

Thus, since the image file F is transmitted from the terminal adapter TA1 to the terminal adapter TA2 and is then stored, a user of the receiving-side network system 20 can print the stored image file F by operating the printer MPF2. Alternatively, the image file F may be automatically printed by the printer MFP2 when the image file F is received by the terminal adapter TA2.

In the transmitting and receiving system having the configuration described above, the transmitting-side system and the receiving-side system create the file storage tables 52a and 52b having the same configuration, respectively. In addition, the transmitting-side system divides the image file F to be transmitted, adds the Number information Ni, stores data obtained by above processing as the storage data HDi in each unit table UTi included in the file storage table 52a, and sequentially transmits the storage data HDi. On the other hand, the receiving-side system stores the received storage data HDi in a place corresponding to the Number information Ni of the file storage table 52b in the order in which the storage data HDi is received referring to the Number information Ni. Accordingly, even when the order in which the storage data HDi reaches is changed for some reasons, a sequence control of transmitted data can be efficiently and easily performed.

In the transmitting and receiving system having the configuration described above, when the transmitting-side system and the receiving-side system perform transmitting and receiving processing using the file storage tables 52a and 52b having the same configuration, the receiving-side system returns to the transmitting-side system the receiving notice RNi, which indicates the Number information Ni corresponding to the received storage data HDi, if the receiving-side system receives the storage data HDi. Thus, since the transmitting-side system receives the receiving notice RNi and the receiving-side system receives the storage data HDi, the transmitting-side system or the receiving-side system can detect that the opposite communication party can normally communicate therewith. In addition, even when a communication is not possible due to a certain problem, such situation can be detected. Accordingly, a reliable communication can be performed while the transmitting-side system and the receiving-side system are checking a communication state of the opposite party. In addition, the transmitting-side system can quickly determine the ending time of data transmission processing on the basis of the receiving notice RNi.

Furthermore, in the transmitting and receiving system having the configuration described above, the receiving-side system transmits to the transmitting-side system the receiving notice RNi indicating the Number information Ni of the received storage data HDi, and the transmitting-side system deletes the unit table UTi of the file storage table 52a corresponding to the Number information Ni indicated by the received receiving notice RNi and retransmits the storage data HDi stored in the remaining unit table UTi that the receiving-side system may not have received. Accordingly, since reconstruction of retransmitted data is not needed at the time of retransmission of data, efficient access to transmitted data can be performed. In addition, since only data that the receiving-side system may not have received is retransmitted, efficient data transmission can be performed. In addition, the transmitting-side system can quickly determine the ending time of data transmission processing on the basis of a data storage state of the file storage table 52a.

In addition, in the transmitting and receiving system having the configuration described above, the transmitting-side system can determine the ending time of the data transmission processing by receiving all the receiving notice RNi corresponding to the transmitted storage data HDi from the receiving-side system and can also determine the ending time of the data transmission processing by receiving the receiving completion notice END, which notifies that all the storage data HDi has been received, from the receiving-side system. Accordingly, even if a part of the receiving notice RNi is missing in a communication process or the receiving completion notice END is missing, the ending time of the transmission processing can be quickly determined by using one of the above two methods.

In addition, in the transmitting and receiving system having the configuration described above, when the transmitting-side system does not receive the receiving notice RNi for a predetermined period of time, the file transmission processing is stopped regardless of a data storage state of the file storage table 52a. Accordingly, in the case when a trouble occurs in a communication process or in the receiving-side system during the communication, transmission of data can be quickly stopped. As a result, useless data transmission can be avoided.

In addition, in the transmitting and receiving system having the configuration described above, when the receiving-side system receives data information and creates the file storage table 52b, a notice that receiving is possible, which indicates that preparation to receive the storage data HDi has been completed, is transmitted to the transmitting-side system. On the other hand, the transmitting-side system transmits the storage data HDi after receiving the notice that receiving is possible. Thus, since the transmitting-side system transmits data after checking the state of the receiving-side system, the communication can be reliably performed.

Furthermore, in the present embodiment, the terminal adapter TA1 adds the ID information I, the Number information Ni, and the Length information Li to the divided data SDi of the image file F, stores the divided data SDi obtained after the addition as the storage data HDi in the file storage table 52a, and sequentially transmits the storage data HDi to the terminal adapter TA2. However, the invention is not limited to such a method. For example, only the divided data SDi may be stored in the file storage table 52a, and the divided data SDi may be transmitted after adding the Number information Ni and the Length information Li thereto at the time of transmission of the divided data SDi. In addition, instead of adding the ID information I, a position management table for managing information on the position of the file storage table 52a may be separately created so that a region used for the file storage table 52a can be identified by using the table. In this case, the terminal adapter TA1 may update the position management table whenever the receiving notice RNi is received so that the unit table UTi corresponding to the received receiving notice RNi is not recognized as the file storage table 52a. On the other hand, the terminal adapter TA2 may store only the divided data SDi in the file storage table 52b. In addition, instead of dividing the image file F and storing the divided data in the file storage table 52a, the terminal adapter TA1 may create a position management table, in which division sequence information of the image file F is associated with a range of each of the divided data SDi, and may take out the divided data SDi, which corresponds to a portion to be transmitted, from the image file F stored in the EEPROM 60 on the basis of the position management table whenever transmission of the divided data SDi is performed and then transmit the divided data SDi.

Moreover, in the present embodiment, the terminal adapter TA1 sequentially transmits the storage data HDi stored in all the unit tables UTi included in the file storage table 52a in step S180 and then retransmits the remaining unit table UTi, which remains after steps S190 to S210, again in step S180. However, the invention is not limited to such a method. For example, in step S180, a predetermined number of storage data HDi may be transmitted and then a next predetermined number of storage data HDi may be transmitted after receiving all the receiving notice RNi corresponding to the previously transmitted data.

Furthermore, in the present embodiment, the Number information Ni is added to the divided data SDi and then the divided data SDi added with the Number information Ni is stored as the storage data HDi in the file storage table 52a in step S150, and the receiving notice RNi indicating the Number information Ni included in the received storage data HDi is transmitted to the terminal adapter TA1 in step S370. However, the invention is not limited to such a method. For example, in step S150, the Number information Ni does not necessarily need to be added. In this case, other information allowing the received storage data HDi to be identified, for example, attached checksum or CRC (cyclic redundancy check) may be transmitted as the receiving notice RNi.

Having described the embodiment of the invention, the invention is not limited to the above-described embodiment but various modifications can be made within the scope without departing from the subject matter or spirit of the invention. For example, a transmitting apparatus or a receiving apparatus according to the embodiment of the invention may also be applied to various kinds of data, such as a video file, without being limited to the image file F illustrated in the embodiment. In addition, the invention may be applied to all kinds of packet communications, without being limited to the communication performed through the VoIP network using the RTP and the UDP. Moreover, the invention may also be realized in a form of a transmitting apparatus/receiving apparatus, a transmitting and receiving/receiving/transmitting method, a receiving/transmitting program, a computer-readable recording medium in which a program is recorded, and the like.

What is claimed is:

1. A transmitting and receiving system comprising:
a transmitting apparatus and a receiving apparatus that transmits and receives data through a network that exchanges data using a packet,
wherein the transmitting apparatus includes:
a transmission data dividing unit that divides the data to be transmitted into divided data having a size equal to or smaller than the size of the packet;
a transmission data storing unit that stores the divided data in a transmission data region prepared in a storage region;
a data transmitting unit that repeatedly transmits the divided data present in the transmission data region to the receiving apparatus;
an identification information receiving unit that receives identification information for identifying received divided data, which is returned from the receiving apparatus that has received the divided data in response to transmission of the divided data; and
a transmission-completed divided data excluding unit that excludes the divided data corresponding to the identification information from the transmission data region on the basis of the received identification information, and
the receiving apparatus includes:

a received data storing unit that receives the divided data through the network and stores the received divided data in a storage region;

an identification information replying unit that returns identification information for identifying the divided data to the transmitting apparatus at least whenever the divided data is received; and a receiving completion unit that completes receiving of the data after receiving all the divided data.

2. A transmitting apparatus that transmits data to a receiving apparatus through a network that exchanges data using a packet, comprising:

a transmission data dividing unit that divides the data to be transmitted into divided data having a size equal to or smaller than the size of the packet;

a transmission data storing unit that stores the divided data in a transmission data region prepared in a storage region;

a data transmitting unit that repeatedly transmits the divided data present in the transmission data region to the receiving apparatus;

an identification information receiving unit that receives identification information for identifying the received divided data, which is returned from the receiving apparatus that has received the divided data in response to transmission of the divided data; and a transmission-completed divided data excluding unit that excludes the divided data corresponding to the identification information from the transmission data region on the basis of the received identification information.

3. The transmitting apparatus according to claim 2, wherein the data transmitting unit transmits the divided data by using a protocol that does not perform retransmission control.

4. The transmitting apparatus according to claim 2, wherein the data transmitting unit completes transmission of the divided data when a notice indicating that all the divided data has been received is received from the receiving apparatus.

5. The transmitting apparatus according to claim 2, wherein transmission of the divided data is stopped when the identification information receiving unit does not receive the identification information for a predetermined period of time.

6. The transmitting apparatus according to claim 2, further comprising:

a data information transmitting unit that transmits at least data information on the capacity of the transmitted data before transmission of the data, wherein the data transmitting unit sequentially transmits the divided data to the receiving apparatus through the network together with sequence information added corresponding to sequence of the divided data of the data to be transmitted.

7. The transmitting apparatus according to claim 2, wherein after a notice, which indicates that preparation to receive the divided data to be transmitted and sequence information has been completed, is received from the receiving apparatus, the data transmitting unit transmits the divided data and the sequence information to the receiving apparatus.

8. A receiving apparatus that receives data from a transmitting apparatus through a network that exchanges data using a packet, comprising:

a data region securing unit that receives data information on a capacity of transmitted data from the transmitting apparatus and secures a storage region corresponding to the capacity as a received data region before receiving the data;

a divided data receiving unit that sequentially receives the divided data, which is obtained by dividing the transmitted data in a size equal to or smaller than the size of the packet, from the transmitting apparatus through the network together with sequence information corresponding to sequence of the divided data of the data to be transmitted; and a received data storing unit that stores received divided data at a position corresponding to the sequence information in the received data region.

9. The receiving apparatus according to claim 8, further comprising:

a preparation completion notice transmitting unit that notifies the transmitting apparatus that preparation to receive the divided data and the sequence information has been completed when the data region securing unit secures the received data region.

10. The receiving apparatus according to claim 8, further comprising:

an identification information replying unit that returns identification information for identifying the divided data to the transmitting apparatus at least whenever the divided data is received.

11. The receiving apparatus according to claim 8, further comprising:

a receiving completion notifying unit that transmits a notice, which indicates that receiving of the data has been completed, to the transmitting apparatus after all the divided data is received.

* * * * *